Burgy & Guillemin.
Thread Dressing & Finishing Mach.
No. 21,303. Reissued Jul. 10, 1866.
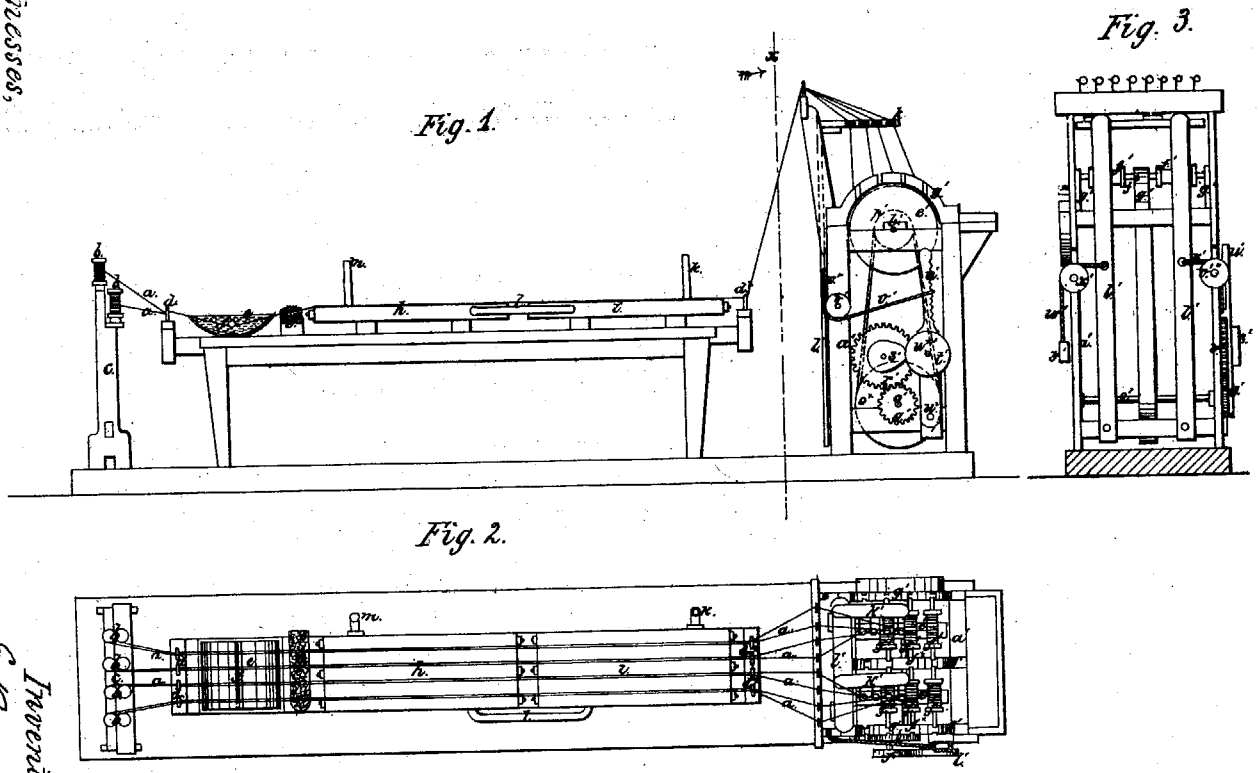
Witnesses,
Henry Morris
E. L. Topliff
Inventors,
E. Burgy
L. Guillemin
Munn & Co. Att.

UNITED STATES PATENT OFFICE.

WILLIAM KIEFER, OF NEW YORK, N. Y., ASSIGNEE OF E. BURGY AND L. GUILLEMIN.

IMPROVEMENT IN MACHINES FOR DRESSING AND FINISHING THREADS, &c.

Specification forming part of Letters Patent No. 46,314, dated February 7, 1865; Reissue No. 2,303, dated July 10, 1866.

*To all whom it may concern:*

Be it known that E. BURGY, of Basle, Switzerland, and LOUIS GUILLEMIN, of Dubolsheim, France, did invent a new and useful Improvement in Machines for Dressing and Finishing Threads, &c.; and I, WILLIAM KIEFER, of the city, county, and State of New York, assignee of the said BURGY and GUILLEMIN, do hereby declare that the following is a full, clear, and exact description of the said improvement, which will enable others skilled in the art to make and use the same, reference being had to the accompanying drawings, forming part of this specification, in which—

Figure 1 represents a vertical side elevation of this invention. Fig. 2 is a plan or top view of the same. Fig. 3 is a transverse vertical section of the same, taken in the plane indicated by the line *x x*, Fig. 1, and looking in the direction of the arrow marked opposite to that line.

Similar letters of reference indicate like parts.

This invention relates to an apparatus which is applicable for the purpose of dressing, finishing, and imparting of luster or gloss to all threads or filaments of silk, cotton, flax, and other fibrous substances, but more especially to yarn, thread, or filaments of waste silk or floss silk, which by the use of this apparatus can be rendered equal in appearance to silk, and thereby much enhanced in value.

The yarn or thread to be operated upon is wound upon bobbins placed upon spindles or skewers which are arranged in rows on a suitable frame. From this frame the threads from the several bobbins pass through guides to the dressing apparatus, entering first into a tank or dish containing the requisite solution or bath. Emerging from this bath the threads pass over sponges or wipers of any suitable material, which may, by preference, be placed over the bath, and which wipe off or absorb the superfluous moisture from the threads and allow it to flow back into the bath. After leaving the wipers the threads, passing again through guides, are dried and finished by being conducted over heated surfaces, and then they are wound again upon bobbins in the winding-frame, which is so arranged that by the action of its bobbins the threads are unwound from the bobbins at the opposite end of the dressing apparatus and drawn through the bath and across the heated surfaces, by the contact with and friction against which they become dried and polished. Gelatine, albumen, glycerine, gum, honey, or other suitable substances, as already known and employed by finishers, may be used for the dressing-bath.

The threads to be operated upon are shown in the drawings in blue outlines and marked *a a*. They are wound on the bobbins *b b* of the frame *c c*. From said bobbins they pass through the eyelets or guides *d d* of the dressing apparatus to the bath *e*, where they pass under the rod *f* and over the sponges or wipers, which absorb or wipe off the surplus moisture adhering to the threads. The position of said wipers ought to be such that the liquid taken up by the same flows back into the bath. From the wipers the threads pass direct, or through suitable guides or eyelets, to the steam-chests *h* and *i*, over whose entire length they travel, and again, guided by eyelets *d**, they pass to the winding-frame, which is hereafter described. By the contact with and friction against the steam-chests *h* and *i* the remaining moisture in the threads is dried up and the threads receive their finish or luster.

The steam for heating the chests *h* and *i* enters the chest *i* through the pipe *k*, then passing through the chest *i* and connecting-pipe *l* to the chest *h*. It may either be allowed to flow off through the pipe *m*, or the pipe *m* may be continued into and through the bath *e*, warming the latter and finally conducting away the steam through a suitable discharge-pipe.

The dressing-bath and steam-chests are or may be supported by a platform or table, as shown in the drawings. By the employment of the flat steam-heaters, as described, advantages are obtained over the use of drums or cylindrical heaters, under the bottom surfaces of which the thread passes, as in the former case the thread will be exposed to a greater amount of heating-surface for the same cubical contents of heater, and if a rotary motion were given to the cylindical heaters referred to there would be a liability to break the thread.

The winding-frame, which serves to wind the finished or dressed thread or bobbins, is supposed to be constructed with twenty-one (more or less) bobbins, to correspond with the same number of bobbins on the bobbin-frame *c c*.

The framing *a′ a′* of this machine forms the bearings for the driving-shaft *b′*, at one end of which are placed a fast and loose pulley. Mounted on this shaft are the pulleys *e′ e′*, each of which supports bobbins *f′ f′*, so that the flanges of said bobbins rest upon the periphery of the corresponding pulley, the spindles *f* f** of the bobbins being guided by the guide-slots of the brackets *g′ g′*. When the shaft *b′*, with the pulleys *e′ e′*, is in motion the bobbins will, by the contact or friction against said pulleys, be caused to revolve, whereby the threads coming from the dressing apparatus and passing through the eyelets and guides, will be wound onto the bobbin *f′*. The guides *i′* receive the necessary to-and-fro motion for causing the threads to be wound uniformly over the whole length of the bobbins. The eyelets or guides *i′*, for each set of these bobbins, are fixed to a small bar of wood, *k′*, secured to a frame, *l′*, which vibrates on pivots secured in one of the lower cross-bars of the frame *a′*.

The vibrating motion of the frame *l′* is produced in the following manner: A shaft, *o′*, with pulleys *o**, and driven from the small pulley *p′* on the driving-shaft *b′*, has a pinion, *g′*, keyed to its end, which gears into the wheel *r′*, that is keyed to a bush revolving on a stud which is bolted to the frame *a′* of the machine. On the same bush is keyed the cam *s′*, against which the disk or roller *t′* bears. This roller turns on a stud fixed to the lever *u′*, which has its fulcrum at *u**. The upper portion of this lever is provided with notches. A cord, *v′*, passes from the lever *u′* over the guide-pulleys *v* v′**, and is attached to one of the rails of the oscillating frame *l′*. A second cord, *w′*, attached to the other rail of the frame *l′*, and passing over the guide-pulley *x′*, has a weight, *y′*, secured to its loose end, so that by the action of this weight the disk *t* is kept in contact with the cam *s′*. As the wheel *r′* and the cam *s′* revolve together, an oscillating motion is imparted to the disk *t′* and the lever *u′*, and this motion is communicated to the frame *l′* and guides *i′*.

Instead of causing the flanges of the bobbins *f′* to rest on the diving-pulleys *e′*, the latter may be made to fit between the flanges in such a manner that the body of the bobbins rests upon the pulleys.

Having thus described the invention of the said E. BURGY and LOUIS GUILLEMIN, what is sought to be covered by the new claim, and desired to be secured by Letters Patent, is—

1. The arrangement of the gum or size bath *e*, wiper *g*, and flat heater or heaters *h i*, and a winding-frame constructed and operating substantially in the manner and for the purpose described.

2. In combination with the gumming device and heater, the winding-frame constructed and operating substantially as and for the purpose described.

WM. KIEFER.

Witnesses:
M. M. LIVINGSTON,
W. HAUFF.